United States Patent [19]

Saladino

[11] Patent Number: 5,503,329
[45] Date of Patent: Apr. 2, 1996

[54] AUTOMOTIVE THERMOSTAT

[76] Inventor: Paul D. Saladino, P.O. Box 1576, Rochester, N.H. 03867

[21] Appl. No.: 348,913

[22] Filed: Nov. 25, 1994

[51] Int. Cl.⁶ ........................................... F01P 7/16
[52] U.S. Cl. .................... 236/345; 236/DIG. 2; 137/68.27
[58] Field of Search ............... 236/345, DIG. 2; 137/68.27

[56] References Cited

U.S. PATENT DOCUMENTS

| | | |
|---|---|---|
| 2,356,958 | 8/1944 | Wagenheim . |
| 2,418,817 | 4/1947 | Cantlin ........................ 137/68.27 X |
| 2,553,267 | 10/1946 | NeDon . |
| 2,842,317 | 7/1958 | Wood . |
| 2,891,730 | 6/1959 | Wood et al. . |
| 3,498,537 | 3/1970 | Wong . |
| 3,776,457 | 10/1971 | Cardi . |
| 4,347,942 | 11/1980 | Jernberg . |
| 4,347,973 | 1/1981 | Jackson . |
| 4,353,500 | 2/1981 | Brown . |
| 4,359,972 | 6/1981 | Calkins . |
| 4,479,587 | 9/1983 | Mundt . |
| 4,512,491 | 1/1984 | DeGood . |
| 4,576,303 | 2/1985 | Mundt . |
| 4,691,861 | 8/1986 | Sliger . |
| 4,905,722 | 4/1989 | Rooker . |
| 5,022,424 | 10/1990 | Reynolds . |
| 5,140,951 | 8/1992 | Carr ............................ 236/DIG. 2 |
| 5,207,744 | 3/1992 | Heafner . |

Primary Examiner—William E. Tapolcai
Attorney, Agent, or Firm—Shlesinger Arkwright Garvey

[57] ABSTRACT

A thermostat for controlling the flow of coolant in an automotive cooling system comprises a centrally apertured disc forming a valve seat; a saddle member supported on the disc and straddling the aperture; a valve member positioned between the saddle and the disc; a spring biasing the valve member into engagement with the seat; a thermally responsive element for opening the valve against the spring in response to a predetermined temperature rise of the coolant; and a plurality of tabs formed in the disc and concentrically surrounding the valve seat adapted to rupture and deflect in response to a predetermined system pressure rise to form fluid passages bypassing the valve, the tabs being defined by score or cut lines extending partly around each tab.

1 Claim, 1 Drawing Sheet

AUTOMOTIVE THERMOSTAT

FIELD OF THE INVENTION

The present invention relates to an automotive thermostat with an emergency normally closed bypass that is caused to open to insure coolant flow through the system when the thermostat fails in the closed position and where the bypass is integral with the thermostat.

BACKGROUND OF THE INVENTION

As is well known to persons active in the automotive repair business, the most frequent cause of problems in the cooling systems of automobiles is failure of the thermostat in a closed position. Invariably this causes overheating plus a rise in pressure of the cooling system usually sufficient to rupture either a radiator or heater hose. Whenever this happens, the thermostat must be removed or replaced and the hose replaced or patched before the car can be driven.

Prior art attempts to solve this problem include thermostats specifically designed to "fail safe" by various means to insure that the valve remains in an open position rather than a closed position when the thermostat fails due to corrosion or one reason or another. Examples of such structures may be found in any one of the following prior U.S. Pat. Nos. 2,356,958; 2,842,317; 2,891,730; and 3,498,537. For one reason or another however, such valve structures have not found wide spread commercial acceptance whether due to cost of manufacture or inconsistent operational results or both.

Accordingly, the problem remains to produce a thermostat at reasonable competitive cost with conventional thermostats, which will give comparable service lifetime to conventional thermostats and yet which when it fails, will not result in blockage of coolant circulation with the attendant problems which inevitably follow.

OBJECTS AND SUMMARY OF THE INVENTION

It is therefore an object of the present invention to provide an automotive thermostat that provides a bypass for coolant flow when the valve fails in the closed position.

It is another object of the present invention to provide an automotive thermostat that includes an integral bypass for the coolant flow.

It is still another object of the present invention to provide an automotive thermostat that provides a bypass for the coolant flow that is relatively inexpensive to manufacture.

It is yet another object of the present invention to provide an automotive thermostat that is constructed with all outward appearances as conventional thermostats which are in widespread commercial use throughout this country today.

In summary, the present invention provides an automotive thermostat that includes a centrally apertured disc forming a valve seat and a saddle member straddling the aperture and providing a support for a valve member which is spring biased into engagement with the seat, but which will open against the force of the biasing spring in response to a predetermined temperature rise. In accordance with the present invention, the apertured disc at the time that it is formed in the manufacturing operation, will be provided with a series of concentrically arranged, preferably substantially circular score or cut lines to define a series of tab members. Such tab members, in response to a predetermined pressure rise in the system such as would be caused by a thermostat failing in the closed position, will be deflected out of the plane of the disc by reason of rupture from the score or cut lines thereby to form a series of fluid passageways bypassing the main valve.

These and other objects of the present invention will become apparent from the following detailed description.

BRIEF DESCRIPTIONS OF THE DRAWINGS

DETAILED DESCRIPTION OF THE INVENTION

Figure 1:
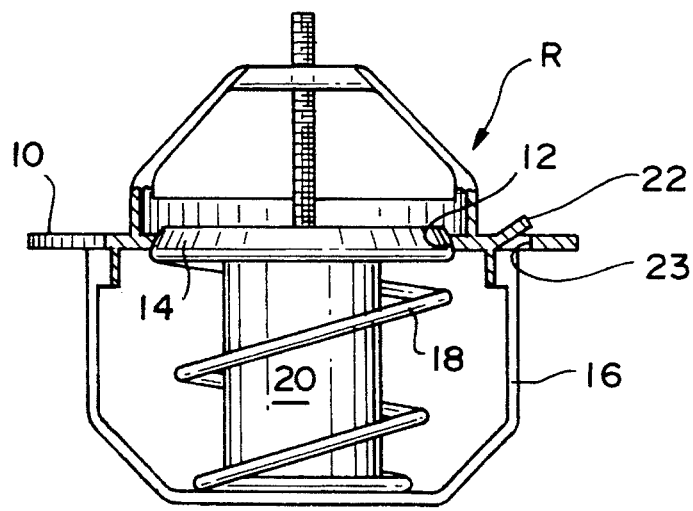
FIG. 1 is a side elevational view, with portion shown in cross-section, of a thermostat made in accordance with the present invention.

As shown in the drawing, a thermostat R made in accordance with the present invention includes a disc 10 having a central aperture 12. The disc 10 forms the seat for a valve member 14 which is supported by a saddle member 16 and biased by a spring 18 into engagement with the valve seat. A thermal element 20 is operative when the automotive coolant reaches a predetermined temperature to open the valve against the force of the biasing spring 18 and permits coolant flow throughout the system.

Figure 2:
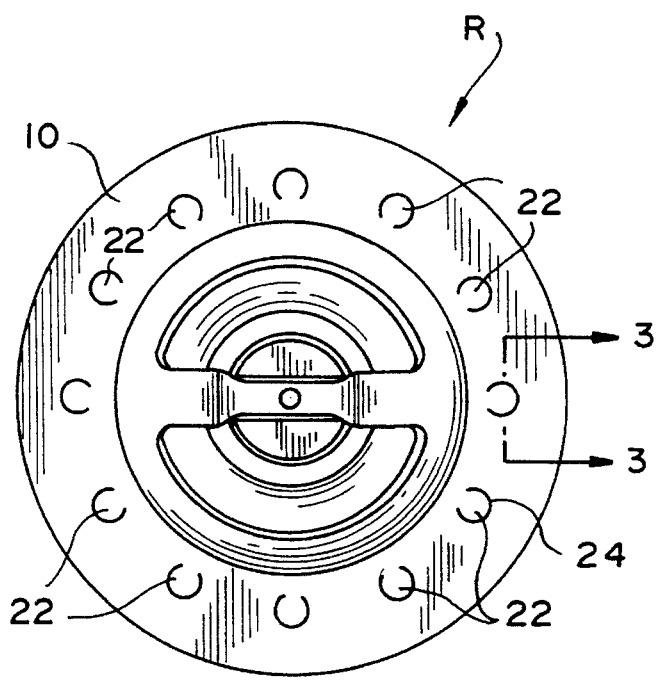
FIG. 2 is a top plan view of FIG. 1.
Figure 3:
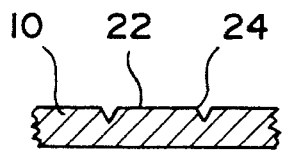
FIG. 3 is a fragmentary enlarged cross-sectional view taken along line 3—3 of FIG. 2, showing the tabs made in accordance with the present invention in the closed position.

In accordance with the present invention, a series of preferably circular tabs 22 are formed in the disc 10 and arranged concentrically around the central aperture 12. The tab 22 are formed in the disc 10 by die pressed score lines 24 which preferably extend somewhat less than 360° around the tab, as best shown in FIGS. 2 and 3. While it is possible and certainly within the scope of the present invention to have the score lines extend a full 360°, it is thought preferable to leave a small section of the tabs 22 without any score lines 24 so that upon a predetermined pressure rise within the system, the tabs 22 will rupture from the disc 10 on the score lines 24 but remain attached thereto by the unscored portion which acts as a hinge. Deflection of the tabs 22 out of the plane of the disc 10 thus results in a series of passageways 23 which bypass the main valve, as best shown in FIG. 1, and therefore permits continued operation of the vehicle without the overheating and pressure rise which would otherwise occur when the thermostat fails in a closed position.

Figure 4:
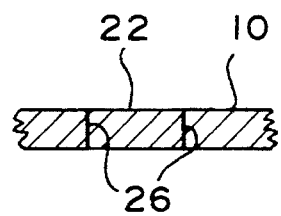
FIG. 4 is a fragmentary enlarged cross-sectional view of another embodiment of the tabs made in accordance with the present invention.

The tabs 22 may also be formed by cut lines 26 that go through the thickness of the disc 10, as best shown in FIG. 4. The cut lines do not extend a full 360° to hold the tabs 22 in place prior to and after being deformed by a predetermined pressure rise in the system. The cut lines 26 insure that the tabs 22 will open up with relatively less pressure within the system.

Since the disc 10 of a conventional thermostat is manufactured by a stamping operation, it would be a simple matter to redesign the stamping die so that the disc 10 could be formed on a mass production basis and at a minimum cost.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A thermostat for controlling the flow of coolant in an automotive cooling system, comprising;

a) a centrally apertured disc forming a valve seat;

b) a saddle member supported on said disc and straddling said aperture;

c) a valve member positioned between said saddle and said disc;

d) a spring biasing said valve member into engagement with said seat;

e) thermally responsive element for opening said valve against said spring in response to a predetermined temperature rise of the coolant; and f) a plurality of tabs formed in said disc and concentrically surrounding said valve seat adapted to rupture and deflect in response to a predetermined system pressure rise to form fluid passages bypassing said valve, said tabs being defined by score lines extending partially around each tab and through the thickness of said disc such that said tabs remain secured to said disc after rupturing.

* * * * *